United States Patent [19]

Sakurai et al.

[11] 4,255,280
[45] Mar. 10, 1981

[54] CATALYST FOR POLYMERIZATION OF OLEFINS

[75] Inventors: Hisaya Sakurai; Hideo Morita; Masayoshi Miya; Katsuhiko Takaya; Haruyuki Yoneda, all of Kurashiki, Japan

[73] Assignee: Asahi Kasei Kogyo Kabushiki Kaisha, Osaka, Japan

[21] Appl. No.: 19,674

[22] Filed: Mar. 12, 1979

[30] Foreign Application Priority Data

| Mar. 15, 1978 | [JP] | Japan | 53-28574 |
| Mar. 15, 1978 | [JP] | Japan | 53-28575 |
| Mar. 22, 1978 | [JP] | Japan | 53-31672 |
| Mar. 24, 1978 | [JP] | Japan | 53-32899 |
| Mar. 28, 1978 | [JP] | Japan | 53-34987 |
| Mar. 28, 1978 | [JP] | Japan | 53-34988 |
| Apr. 14, 1978 | [JP] | Japan | 53-43262 |
| Apr. 14, 1978 | [JP] | Japan | 53-43263 |

[51] Int. Cl.³ .................................................. C08F 4/64
[52] U.S. Cl. .................................. 252/429 B; 526/124; 526/125; 526/128
[58] Field of Search ..................................... 252/429 B

[56] References Cited

U.S. PATENT DOCUMENTS

| 3,549,717 | 12/1970 | Itakura et al. | 252/429 B X |
| 3,784,481 | 1/1974 | Lassau et al. | 252/429 B X |
| 4,159,256 | 6/1979 | Sakurai et al. | 252/429 B |

FOREIGN PATENT DOCUMENTS 2742586  3/1978  Fed. Rep. of Germany .

Primary Examiner—Patrick Garvin
Attorney, Agent, or Firm—Sprung, Felfe, Horn, Lynch & Kramer

[57] ABSTRACT

Catalysts for polymerization of olefin which comprise a solid catalyst component (A) and an organometallic compound with a heterocyclic carboxylic acid ester (B), wherein the solid catalyst component (A) is obtained by reacting or/and grinding an organomagnesium compound (1), of the formula $$M_\alpha Mg_\beta R_p^1 R_q^2 X_r$$

wherein

α, p, q and r each independently $\geq 0$,
$\beta > 0$,
$p + q + r = m\alpha + 2\beta$
M is Al, Zn, B or Be,
m is the valence of M,
$R^1$ and $R^2$ are the same or different hydrocarbon groups having 1–20 carbon atoms, and
X is a halogen atom, or of the reaction product of $M_\alpha Mg_\beta R_p^1 R_q^2 X_r$ with an electron donor, with 0.01 to 100 moles of (ii) a chlorosilane compound containing Si-H bonds and of the formula $$H_a SiClR_4^{3-(a+b)}$$

wherein $0 < a \leq 2,$ a titanium halide (2) and a carboxylic acid ester (3); and the heterocyclic carboxylic acid ester is N—, S—, or O—containing heterocyclic compound, and processes for polymerization of olefin employing such a catalyst.

12 Claims, No Drawings

CATALYST FOR POLYMERIZATION OF OLEFINS

This invention relates to highly active catalysts for highly stereospecific polymerization of olefins and to polymerization processes employing such catalysts. In particular, the present invention is suitable for polymerizing stereospecifically propylene, butene-1, 3-methylbutene-1, pentene-1, 4-methyl-pentene-1 and the like, or also for copolymerizing said olefin with ethylene or other olefins.

It has been well known that stereospecific polymers are produced by using a Ziegler-Natta catalyst system comprising a transition metal compound of a metal Groups IV to VIA of the Periodic Table and an organometallic compound of a metal of Groups I–III of the Periodic Table. Particularly, a combination of a titanium halide and an organoaluminum compound such as triethylaluminum or diethylaluminum chloride is widely used in industrial production as a catalyst for stereospecific polymerization of olefins.

Polymerization of olefins such as propylene carried out with this type of catalyst results in a relatively high stereospecifity, which is shown by a ratio of boiling heptane insoluble polymers to soluble polymers, i.e., stereospecific polymers. However, the polymerization activity of the catalyst is not fully satisfactory and removal of catalyst residue from the resultant polymer is necessary.

Recently, as highly active catalysts for olefin polymerization, many catalysts have been proposed which comprise an inorganic- or organomagnesium compound and a titanium or vanadium compound, or these two components plus an electron donor. For example such catalysts have been known as those using a magnesium halide (British Pat. Nos. 1,335,887, 1,387,888, 1,387,889, 1,387,890 and Japanese Patent Publication Nos. 52-36786, 52-36913), those using a magnesium alkoxide (Japanese Patent Laid Open No. 49-149193), those using a magnesium hydroxy chloride (Canadian Pat. No. 739,550 which corresponds to Japanese Patent Publication No. 43-13050), those using a magnesium carbonate (Japanese Patent Publication No. 46-34094), those using a magnesium oxide (Japanese Patent Publication No. 46-11669), those using an alkylmagnesium (British Pat. No. 1,373,981), those using Grignard compound (British Pat. No. 1,390,001) and those wherein a titanium or a vanadium compound is supported on a carrier which is produced by treating a magnesium halide with Si-(OR)$_n$X$_{4-n}$, wherein X is halogen, (Japanese Patent Publication No. 51-37194).

Some of these catalyst show notable activity for polymerization of olefins but with too much amorphous content, or other of these catalysts show high stereoregularity but with insufficiency in polymerization activity. Therefore, they are hardly used per se as catalyst for new industrial stereospecific polymerization of olefins, for which it is necessary to have both sufficient polymerization activity and stereoregularity. Particularly, they are insufficient in polymer yield per solid catalyst component, and the polymers produced have a large content of halogen which brings about corrosion of polymerization equipment and molding machines. Further, some of the physical properties of the polymer are unsatisfactory.

Furthermore, new catalysts produced from a magnesium solid component have been proposed for stereospecific polymerization in U.S. applications Ser. Nos. 836,343, 873,630 and 876,823 filed on Sept. 26, 1977, Jan. 30, 1978 and Feb. 10, 1978, respectively and now U.S. Pat. Nos. 4,159,965, 4,159,963 and 4,159,256, respectively, the disclosures of which are incorporated herein by reference. In more detail, a magnesium solid is produced by reaction of a hydrocarbon soluble organomagnesium with a chlorosilane compound containing a Si—H bond. Said magnesium solid, which does not belong in the category of the above mentioned magnesium compound, is reacted and/or ground with a titanium compound and a hydrocarbyl-carboxylic acid or its derivatives. Thus, an obtained product is used as a catalyst component with an organometal compound together with a hydrocarbon-carboxylic acid or its derivatives.

In view of the foregoing catalysts, it would be highly desirable to provide a catalyst which has excellent properties and characteristics as above mentioned, such as high stereoregularity and sufficient activity, and to produce such high quantities of polymer per solid catalyst component that it is no longer necessary to remove catalyst residue.

The present invention, in one aspect, is a catalyst useful for polymerizing olefins comprising a magnesium compound, a titanium compound, an electron donor, and an organometallic compound, which is characterized in that a solid (1) is obtained by reacting one mole of an organomagnesium component (i) represented by the general formula

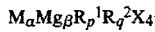

wherein M is a metal component selected from Al, Zn, B and Be; R$^1$ and R$^2$ are the same or different hydrocarbon groups having 1 to 20 carbon atoms; X is a halogen atom; β is a number greater than zero; α, p, q and r are each numbers zero or greater than zero, respectively, having the relationship of p+q+r=mα+2β; m is a valency of M: or one mol of the reaction product obtained by the reaction of the organomagnesium component (i) with an electron donor selected from ethers, thioethers, ketones, aldehydes, hydrocarbyl carboxylic acids or derivatives thereof, alcohols, thioalcohols and amines, with 0.01 to 100 mol of chlorosilane compound (ii) containing Si—H bonds and represented by the general formula

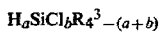

wherein 0<a≦2, b>0, a+b≦4, and R$^3$ is a hydrocarbon group having 1 to 20 carbon atoms, that a solid catalyst component (A) is obtained by reacting and/or grinding said solid (1), a titanium compound (2) selected from the halides of tetravalent titanium or trivalent titanium and a compound (3) selected from nitrogen-containing heterocyclic carboxylic acid esters, sulfur-containing heterocyclic carboxylic acid esters, oxygen-containing heterocyclic carboxylic acid esters and hydrocarbyl carboxylic acid esters, and that said solid catalyst component (A) is used with a component (B) comprising an organometallic compound and a heterocyclic carboxylic acid ester selected from nitrogen-containing heterocyclic carboxylic acid esters, sulfur-containing heterocyclic carboxylic acid esters and oxygen-containing heterocyclic carboxylic acid esters.

In a second aspect, the invention is a catalyst wherein, as the solid catalyst component (A) in the above mentioned catalyst system, is used the solid catalyst component (A) which is further treated with a halide of tetravalent titanium before combination with (B).

The first feature of the present invention is in that the catalyst efficiency based on titanium metal and solid catalyst component is extremely high. For example, as will become clear from Example 24 hereinafter described, a catalyst efficiency of 6100 g-polypropylene(PP)/g-solid catalyst component or 508000 g-PP/g-Ti was obtained in the case of propylene polymerization in hexane. In the case of Example 4, wherein the propylene polymerization was conducted in liquid propylene, a catalyst efficiency of 330,000 g-PP/g-Ti.-hour or 7600 g-PP/g-solid catalyst component.hour or more was readily attained. Therefore, in Example 24, the Ti-content and Cl-content of polypropylene at the time of polymerization are about 2 ppm and 55 ppm, respectively.

This indicates that it is no longer necessary to remove the catalyst residue from the propylene prepared by the using this catalyst. In other words, the present catalyst is of extremely good performance which permits elimination of the catalyst residue removal steps.

The second feature of the present invention is in that higher stereospecifity is achieved in addition to the above mentioned high activity, the boiling heptane-insoluble portion being as high as 96.4%.

The third is in that when hydrogen is used as a molecular weight regulator in the polymerization process employing the present catalyst, it is possible to carry out the polymerization process in a small amount of hydrogen in order to get a polymer having a desired molecular weight.

The fourth aspect is in that almost no scale deposits on the reactor during polymerization.

The fifth aspect is in that the obtained polymer is of good grain size and polymer powder having a high bulk density can be obtained. As indicated in the following Examples, densities are 0.43 g/ml or more.

The sixth aspect is in that the angle of repose of the polymer is small and consequently, handling of the polymer powder is improved.

DETAILED DESCRIPTION OF THE PREFERRED EMBODIMENTS

Each of the component materials and reaction conditions employed for the preparation of the catalyst will be described hereinafter in detail.

Firstly, explanation will be given with respect to an organomagnesium component (i) represented by the general formula $M_\alpha Mg_\beta R_p^1 R_q^2 X_r$ (wherein $\alpha$, $\beta$, p, q, r, M, X, $R^1$ and $R^2$ have the same meanings as described above). This component (i) is shown in the form of a complex compound of an organomagnesium but includes so-called Grignard compounds RMgX, $R_2Mg$ and the complexes of these compounds with other metallic compounds.

The hydrocarbon groups represented by $R^1$ and $R^2$ in the general formula have 1 to 20 carbon atoms. They may include aliphatic hydrocarbon groups, alicyclic hydrocarbon groups and aromatic hydrocarbon groups such as, for example, methyl, ethyl, propyl, butyl, amyl, hexyl, decyl, cyclohexyl, phenyl and the like. Of these hydrocarbon groups, an alkyl group is particularly preferred.

As halogen X, fluorine, chlorine, bromine and iodine are used but chlorine is preferable.

As metal atom M, aluminum, zinc, boron and beryllium are preferred for the reason that these metals easily form a hydrocarbon soluble organomagnesium complex.

The first component of the organomagnesium component (i) is an organomagnesium complex which comprises the above mentioned metal (M) and magnesium. A preferred organomagnesium complex, wherein the complex corresponds to $\alpha > 0$ and $r = 0$ in the general formula, is soluble in an inert hydrocarbon. In these complexes, the ratio of magnesium to metal ($\beta/\alpha$) is preferably about 0.1 or more, more preferably at least about 0.5 and most preferably in the range of about 1 to 10.

These organomagnesium complexes are synthesized by reacting an organomagnesium compound $R^1MgX$, $R_2^1Mg$ and $R^1R^2Mg$ mentioned hereinafter, with an organometallic compound represented by $MR_m^2$ or $MR_{m-1}^2H$, wherein M, $R^2$ and m have the same meanings as above mentioned, in an inert hydrocarbon medium such as hexane, heptane, cyclohexane, benzene, toluene and the like at a temperature in the range from about room temperature to 150° C. Further, the organomagnesium complex also can be prepared by reacting $MgX_2$ with $MR_m^2$, $MR_{m-1}^2H$, or by reacting $R^1MgX$, $MgR_2^1$ with $R_n^2MX_{m-n}$ wherein n is a number of 0 to m.

The preferred second example of the organomagnesium component (i) is a hydrocarbon-soluble magnesium compound $MgR_p^1R_q^2$ which corresponds to $\alpha = 0$ and $r = 0$ in the general formula. In the present invention it is preferable that the organomagnesium component (i) is soluble in the hydrocarbon solvent.

Therefore, the hydrocarbon-soluble magnesium compound $MgR_p^1R_q^2$ is one of compounds shown in the following three cases:

(a) at least one of $R^1$ and $R^2$ represents a sec- or tert-alkyl group having 4 to 6 carbon atoms;

(b) $R^1$ and $R^2$ represent alkyl groups having a different number of carbon atoms;

(c) at least one of $R^1$ and $R^2$ represents a hydrocarbon group having 6 or more carbon atoms;

Especially preferable $R^1$ and $R^2$ are one of the following three cases:

(a)' $R^1$ and $R^2$ both are hydrocarbon groups having 4 to 6 carbon atoms, and at least one of them is a sec- or tertalkyl group;

(b)' $R^1$ is an alkyl group having 2 to 3 carbon atoms, and $R^2$ is an alkyl group having at least 4 carbon atoms; and (c)' $R^1$ and $R^2$ both are alkyl groups having at least 6 carbon atoms.

In case of (a) and (a)', exemplary groups include sec—$C_4H_9$, tert—$C_4H_9$, —$CH(C_2H_5)_2$, —$C(C_2H_5)(CH_3)_2$, —$CH(CH_3)(C_4H_9)$, —$CH(C_2H_5)(C_3H_7)$, —$C(CH_3)_2(C_3H_7)$, —$C(CH_3)(C_2H_5)_2$ and the like. A sec-alkyl group is preferred and sec—$C_4H_9$ is especially preferred.

In a case of (b) and (b)', ethyl and propyl are preferred alkyl groups, and ethyl is most preferred. Exemplary alkyl groups having 4 or more carbon atoms include butyl, amyl, hexyl, octyl and the like. Butyl and hexyl are preferred.

In case of (c) and (c)', hydrocarbon groups having at least 6 carbon atoms include hexyl, octyl, decyl, phenyl and the like. An alkyl group is preferred. Hexyl is most preferred.

Therefore, an exemplary hydrocarbon-soluble magnesium compound $R_p^1R_q^2Mg$ includes (sec—$C_4H_9)_2Mg$, (tert—$C_4H_9)_2Mg$, n—$C_4H_9MgC_2H_5$, n—$C_4H_9Mgsec$—$C_4H_9$, n—$C_4H_9Mgtert$—$C_4H_9$, n—$C_6H_{13}MgC_2H_5$, n—$C_8H_{17}MgC_2H_5$, (n—$C_6H_{13})_2Mg$, (n—$C_8H_{17})_2Mg$, (n—$C_{10}H_{21})_2Mg$ and the like.

A third exemplary organomagnesium compound within formula (i) is $R^1MgX$ corresponds to $\alpha=0, \beta=1, q=0, r=1$ in the general formula and is well known as a Grignard compound. Gnerally, the Grignard compound is synthesized not only in ether solution but also in hydrocarbon solvent. In the present invention, compounds provided both ways are employed as the organomagnesium component (i). There are, for example, methyl magnesium chloride, methyl magnesium bromide, methyl magnesium iodide, ethyl magnesium chloride, ethyl magnesium bromide, ethyl magnesium iodide, n- or iso-propyl magnesium chloride, n- or iso-propyl magnesium bromide, n- or iso-propyl magnesium iodide, n-butyl magnesium chloride, n-butyl magnesium bromide, n-butyl magnesium iodide, sec- or tert-butyl magnesium chloride, sec- or tert-butyl magnesium bromide, sec- or tert-butyl magnesium iodide, n-amyl magnesium chloride, n-amyl magnesium bromide, hexyl magnesium chloride, hexyl magnesium bromide, octyl magnesium chloride, phenyl magnesium chloride, phenyl magnesium bromide and ether coordinate complexes with one of these compounds. Such ether includes dimethylether, diethylether, diisopropylether, dibutylether, diallylether, tetrahydrofuran, dioxane, anisole and the like.

In the present invention, the organomagnesium component (i) is used, itself, as a reaction agent to be reacted with a chlorosilane compound (ii). However, the reaction product of the organomagnesium component (i) and an electron donor can be also employed. In this case, the organomagnesium component (i) is preferably a hydrocarbon soluble compound or complex such as $R^1R^2Mg$, $R_2^1Mg$ and $M_\alpha MgR_p^1R_q^2$. The electron donor should be selected from ethers, thioethers, ketones, aldehydes, carboxylic acids or derivatives thereof, alcohols, thioalcohols and amines. All these electron donors are well known compounds.

For example, the ether is shown by the general formula ROR' wherein R and R' include aliphatic, aromatic and alicyclic hydrocarbon groups having 1 to about 20 carbon atoms. Exemplary groups may be methyl, ethyl, propyl, butyl, amyl, hexyl, decyl, octyl, dodecyl, cyclohexyl, phenyl, benzyl and the like.

The thioether is shown by the general formula RSR' (wherein R and R' have the same meanings as mentioned for ROR') and the exemplary groups are the same as described in RSR'.

The ketones are shown by the general formula RCOR' (wherein R and R' have the same meanings as described for ROR'). Exemplary groups are methyl, ethyl, propyl, butyl, hexyl, cyclohexyl, phenyl and the like. Of these compounds, dimethyl ketone and diethyl ketone are preferred.

As the aldehydes are also used well known aliphatic, aromatic and alicyclic aldehydes having 1 to about 20 carbon atoms.

As the hydrocarbyl carboxylic acid or derivatives thereof are used aliphatic, alicyclic and aromatic, saturated and unsaturated carboxylic acids, wherein the number of carbon atoms of the carboxylic acids can vary widely, but may be 1 to about 20, their acid anhydrides, their esters, their carboxylic halides and their acid amides. Exemplary hydrocarbyl carboxylic acids include formic acid, acetic acid, propionic acid, butyric acid, valeric acid, oxalic acid, malonic acid, succinic acid, maleic acid, acrylic acid, benzoic acid, toluic acid, terephthalic acid, etc. As hydrocarbyl carboxylic anhydrides, for example, acetic anhydride, propionic anhydride, n-butyric anhydride, succinic anhydride, maleic anhydride, benzoic anhydride, phthalic anhydride, etc. are preferable. As hydrocarbyl carboxylic acid esters, the alcohol of the ester group may include 1 to about 20 carbon atoms, for example, emthyl or ethyl formate, methyl, ethyl or propyl acetate, methyl, ethyl, propyl or butyl propionate, ethyl butyrate, ethyl valerate, ethyl caproate, ethyl n-heptanoate, dibutyl oxalate, ethyl succinate, ethyl malonate, dibutyl malate, methyl or ethyl acrylate, methyl methacrylate, methyl, ethyl, propyl or butyl benzoate, methyl, ethyl, propyl, butyl or amyl toluate, methyl, or ethyl p-ethylbenzoate, methyl, ethyl, propyl or butyl anisate, methyl or ethyl p-ethoxybenzoate. As hydrocarbyl carboxylic halides are preferably used carboxylic chlorides such as acetyl chloride, propionyl chloride, butyryl chloride, succinoyl chloride, benzoyl chloride, tolyl chloride, etc. As hydrocarbyl carboxylic amides are used dimethyl formamide, dimethyl acetamide, dimethyl propionamide, etc.

The alcohols and thioalcohols used are also well known aliphatic, aromatic, alicyclic compounds having 1 to about 20 carbon atoms. Exemplary alcohols include methyl alcohol, ethyl alcohol, propyl alcohol, butyl alcohol, amyl alcohol, hexyl alcohol, phenol, cresol and the like, preferably sec- or tert-alcohols or aromatic alcohols such as sec-propyl alcohol, sec-butyl alcohol, tert-butyl alcohol, sec-amyl alcohol, tertamyl alcohol, sec-hexyl alcohol, phenol, o,m,p-cresol, etc. Exemplary thioalcohols include methyl mercaptan, propyl mercaptan, butyl mercaptan, amyl mercaptan, hexyl mercaptan, phenyl mercaptan, etc. Sec-, tert- or aromatic thioalcohols are preferred.

The amines include aliphatic, alicyclic or aromatic amines having 1 to about 20 carbon atoms. They are preferably sec- or tert-amines such as trialkyl amine, triphenyl amine, pyridine, etc.

The reaction between the organomagnesium component (i) and the electron donor is conducted in an inert hydrocarbon medium such as aliphatic, aromatic or alicyclic hydrocarbons and their mixtures. The reaction order of these compounds is optional. For example, the electron donor is added to the organomagnesium component (i), or vice versa, or both components are simultaneously added to a reaction zone. In these reactions, the amount of the electron donor is not limited, but preferably is less than about 1 mol, more preferably in the range of about 0.01 to 0.8 mol, most preferably about 0.05 to 0.5 mol based on 1 mol of the organomagnesium component (i).

The above mentioned organomagnesium component (i) or the reaction product of the organomagnesium component (i) with the electron donor is used to produce the solid (1) by reaction with a chlorosilane compound (ii) containing Si-H bonds, represented by the general formula $H_aSiCl_nR_{4-(a+b)}^3$.

In the general formula, a, b and $R^3$ have the same meanings as mentioned above, and hydrocarbon groups represented by $R^3$ have 1 to 20 carbon atoms. They include aliphatic-, alicyclic- or aromatic-hydrocarbon groups such as methyl, ethyl, propyl, butyl, amyl, hexyl, decyl, cyclohexyl, phenyl and the like. Preferably the hydrocarbon group is an alkyl group having 1 to 10 carbon atoms and a lower alkyl group such as methyl, ethyl, propyl is particularly preferred. The range of the value of a and b is defined by $a>0$, $b>0$, $a+b \leq 4$ and $0<a \leq 2$. The exemplary chlorosilane compound includes $HSiCl_3$, $HSiCl_2CH_3$, $HSiCl_2C_2H_5$, $HSiCl_{2}n—C_3H_7$, $HSiCl_2i—C_3H_7$, $HSiCl_2n—C_4H_9$, $HSiCl_2C_6H_5$, $HSiCl_2(4\text{-}Cl\text{-}C_6H_4)$, $HSiCl_2CH=CH_2$, $HSiCl_2CH_2C_6H_5$, $HSiCl_2(1—C_{10}H_7)$, $HSiCl_2CH_2CH=CH_2$, $H_2SiClCH_3$, $H_2SiCl_2C_2H_5$, $HSiCl(CH_3)_2$, $HSiClCH_3(i—C_3H_7)$, $HSiClCH_3(C_6H_4)$, $HSiCl(C_6H_5)_2$, and the like. This compound alone, a mixture of these compounds or a mixture partially containing any of these compounds is used. Preferred chlorosilane compounds are trichlorosilane, monomethyldichlorosilane, dimethylchlorosilane, and ethyldichlorosilane. Especially preferred chlorosilanes are trichlorosilane and monomethyldichlorosilane. In these compounds, it is important there is a Si—H bond. As evidenced by specific examples and comparative examples, preferred results cannot be obtained with silane compounds containing no Si—H bonds.

Hereinafter, the reaction between the organomagnesium component (i) and the chlorosilane compound (ii) is illustrated.

The reaction is conducted in an inert medium such as aliphatic hydrocarbon (e.g., hexane, heptane, etc.), aromatic hydrocarbon (e.g., benzene, toluene, xylene, etc.), alicyclic hydrocarbon (e.g., cyclohexane, methyl cyclohexane, etc.), ether (e.g., ether, tetrahydrofuran, etc.) or mixtures.

Of these media, aliphatic hydrocarbons are preferable from the point of catalyst performance. With regard to the reaction temperature, there is not particular limitation but from the point of reasonable reaction rate, the reaction is preferably carried out at a temperatures of about 40° C. or more. The reaction ratio of the two components is not particularly limited, but it is recommended to use about 0.01 to 100 mol, preferably about 0.1 to 10 mol of the chlorosilane compound (ii) per 1 mol of magnesium in the organomagnesium component (i).

As to the manner of the reaction, it can involve (i) simultaneously introducing the two components, [i.e., (i) and (ii)] into a reaction zone, (ii) previously charging the chlorosilane compound into the reaction zone, then introducing the organomagnesium component to the reaction zone to react therein, or (iii) previously charging the organomagnesium component, then introducing the chlorosilane compound. The latter two methods are preferable, with method (ii) providing particularly good results.

Where organomagnesium component (i) is insoluble, it is also possible to conduct the reaction heterogeneously in a reaction zone using the chlorosilane compound (ii) as reactant. In this case, too, the aforesaid conditions are preferred as to temperature, reaction ratio and the manner of reaction.

The structure and the composition of the solid (1) obtained according to the above-mentioned reaction, may vary according to the starting raw materials, and reaction conditions, but the analytical value shows that the solid (1) is a magnesium compound containing a halogen atom and about 0.1–2.5 millimol of hydrocarbon group having a Mg—C bond per g solid material. This solid (1) has an extremely large specific surface area showing a value as high as about 100–300 m²/g according to the measurement by B.E.T. method. The solid (1) has an extremely higher surface area compared with a conventional magnesium halide solid and it is a characteristic feature that said solid (1) is an active magnesium compound containing a hydrocarbon group and possessing reducing power.

Further description will be made with regard to the tetra or trivalent titanium halide (2) which is a raw material of the solid catalyst component (A) as well as the above mentioned solid (1) and heterocyclic or hydrocarbyl carboxylic acid ester (3) described hereinafter.

As the tetravalent titanium halide, there are included titanium halides, titanium alkoxyhalides and mixtures thereof such as titanium tetrachloride, titanium tetrabromide, titanium tetraiodide, trimethoxytitanium chloride, dimethoxytitanium dichloride, methoxytitanium trichloride, triethoxytitanium chloride, diethoxytitanium dichloride, ethoxytitanium trichloride, tripropoxytitanium chloride, dipropoxytitanium dichloride, propoxytitanium trichloride, butoxytitanium trichloride, dibutoxytitanium dichloride, tributoxytitanium monochloride, etc.

As the halides of trivalent titanium, there may be used titanium trichloride, titanium tribromide, titanium triiodide and a solid solution containing one of these components such as a solid solution of titanium trichloride and aluminum trichloride, a solid solution of titanium tribromide and aluminum tribromide, a solid solution of titanium trichloride and vanadium trichloride, a solid solution of titanium trichloride and ferric chloride, a solution solution of titanium trichloride and zirconium trichloride, etc. Preferred trivalent titaniums are titanium trichloride and a solid solution of titanium trichloride and aluminum trichloride ($TiCl_3.1/3AlCl_3$).

Description will now be given with regard to the component (3) selected from a nitrogen-containing heterocyclic carboxylic acid ester, sulfur-containing heterocyclic carboxylic acid ester, oxygen-containing heterocyclic carboxylic acid ester and hydrocarbyl carboxylic acid ester.

The preferred heterocyclic carboxylic acid esters are the compounds wherein a carboalkoxy group having 2 to about 20 carbon atoms is bonded on the heterocyclic ring.

As N-containing heterocyclic carboxylic acid esters, for example, are mentioned pyrrol-carboxylic acid esters, indole-carboxylic acid esters, carbazole-carboxylic acid esters, oxazole-carboxylic acid esters, thiazole-carboxylic acid esters, imidazole-carboxylic acid esters, pyrazole-carboxylic acid esters, pyridine-carboxylic acid esters, phenanthridinecarboxylic acid esters, anthrazoline-carboxylic acid esters, phenanthroline-carboxylic acid esters, naphthylidine-carboxylic acid esters, oxadine-carboxylic acid esters, thiazine-carboxylic acid esters, pyridazine-carboxylic acid esters, pyrimidine-carboxylic acid esters, pyrazine-carboxylic acid esters, and the like. Exemplary preferred compounds are pyrrol-2-carboxylic acid methyl, ethyl, propyl or butyl ester, pyrrol-3-carboxylic acid methyl, ethyl, propyl or butyl ester, pyridine-2-carboxylic acid methyl, ethyl, propyl, butyl or amyl ester, pyridine-3-carboxylic acid methyl, ethyl, propyl, butyl or amyl ester, pyridine-4-carboxylic acid methyl, ethyl, propyl, butyl or amyl ester, pyridine-2,3-dicarboxylic acid methyl or ethyl ester, pyridine-2,5-dicarboxylic acid methyl or ethyl ester, pyridine-2,6-dicarboxylic acid methyl or ethyl ester, pyridine-3,5-dicarboxylic acid methyl or ethyl ester, quinoline-2-carboxylic acid methyl or ethyl ester, dimethylpyrrol-carboxylic acid ethyl ester, N-methylpyrrol-carboxylic acid ethyl ester, 2-methylpyridine-carboxylic acid ethyl ester, piperidine-2-carboxylic acid ethyl ester, piperidine-4-carboxylic acid ethyl ester, pyrrolidine-2-carboxylic acid ethyl ester, L-proline ethyl ester, isonipecotinic acid ethyl ester, D,L-pipecolinic acid ethyl ester, nipecotinic acid ethyl ester, etc.

As S-containing heterocyclic carboxylic acid esters, for example, there are mentioned thiophenecarboxylic acid esters, thianaphthene carboxylic acid esters, isothianaphthene carboxylic acid esters, benzothiophene carboxylic acid esters, phenoxathiin carboxylic acid esters, benzothiane carboxylic acid esters, thiaxanthene carboxylic acid esters, thioindoxyl carboxylic acid esters and the like. Exemplary preferred compounds are 2-thiophenecarboxylic acid methyl, ethyl, propyl, butyl or amyl ester, 3-thiophenecarboxylic acid methyl, ethyl, propyl, butyl or amyl ester, 2,3-thiophenedicarboxylic acid methyl or ethyl ester, B 2,4-thiophenedicarboxylic acid methyl or ethyl ester, 2,5-thiophenedicarboxylic acid methyl or ethyl ester, 2-thienyl-acetic acid methyl, ethyl, propyl or butyl ester, 2-thienylacrylic acid methyl or ethyl ester, 2-thienylpyruvic acid methyl or ethyl ester, 2-thianaphthene carboxylic acid methyl or ethyl ester, 3-thianaphthene carboxylic acid methyl or ethyl ester, 3-hydroxy-2-thianaphthene carboxylic acid methyl or ethyl ester, 2,3-thianaphthene dicarboxylic acid methyl or ethyl ester, 2-thianaphthenyl acetic acid methyl or ethyl ester, 3-thianaphthenyl acetic acid methyl or ethyl ester, 2-benzothiophene carboxylic acid methyl or ethyl ester, 3-benzothiophene carboxylic acid methyl or ethyl ester, 4-benzothiophene carboxylic acid methyl or ethyl ester, 1-phenoxathiin carboxylic acid methyl or ethyl ester, 2-phenoxathiin carboxylic acid methyl or ethyl ester, 3-phenoxathiin carboxylic acid methyl or ethyl ester and the like. Of these exemplary compounds, preferred compounds include 2-thiophenecarboxylic acid methyl, ethyl, propyl or butyl ester, 3-thiophene carboxylic acid methyl or ethyl ester, 2-thienyl acetic acid methyl or ethyl ester, 2-thienylacrylic acid methyl or ethyl ester, 2-thianaphthene carboxylic acid methyl or ethyl ester and the like.

As oxygen-containing heterocyclic carboxylic acid esters, for example, there are mentioned furan carboxylic acid esters, dihydrofuran carboxylic acid esters, benzofuran carboxylic acid esters, coumaran carboxylic acid esters, pyran carboxylic acid esters, pyrone carboxylic acid esters, coumalic acid esters, isocoumalic acid esters and the like. Exemplary preferred compound include 2-furan carboxylic acid methyl, ethyl, propyl or butyl ester, 3-furan carboxylic acid methyl ethyl, propyl or butyl ester, 2,3-furan dicarboxylic acid methyl ester, 2,4-furan dicarboxylic acid methyl ester, 2,5-furan dicarboxylic acid methyl ester, 3,4-furan dicarboxylic acid methyl ester, 4,5-dihydro-2-furan carboxylic acid methyl ester, tetrahydrofuran-2-carboxylic acid methyl ester, coumarilic acid methyl ester (2-benzofuran carboxylic acid methyl ether), coumaran-2-carboxylic acid ethyl ester, coumalic acid methyl or ethyl ester, 5-hydroxy-4-ethoxycarboxyl coumarin, 4-ethoxycarbonyl isocoumarin, 3-methyl-2-furan carboxylic acid ethyl ester, isodehydroacetic acid, etc. Of these preferred compounds are 2-furan carboxylic acid methyl, ethyl, propyl or butyl ester, 3-furan carboxylic acid methyl, ethyl, propyl or butyl ester, 4,5-dihydro-2-furan carboxylic acid methyl or ethyl ester, 2-tetrahydrofuran carboxylic acid methyl ester, coumalic acid methyl or ethyl ester, etc.

The hydrocarbyl carboxylic acid ester includes aliphatic, aromatic or alicyclic hydrocarbon carboxylic acid esters, wherein a preferred compound comprises a carboalkoxy group having 2 to about 20 carbon atoms and a hydrocarbon group having 1 to about 20 carbon atoms. Exemplary carboxylic acid esters are ethyl formate, methyl acetate, ethyl acetate, n-propyl acetate, ethyl propionate, ethyl butyrate, ethyl valerate, ethyl capronate, ethyl n-heptanoate, di-n-butyl oxalate, monoethyl succinate, diethyl succinate, ethyl malonate, di-n-butyl malate, methyl acrylate, ethyl acrylate, methyl methacrylate, methyl benozate, ethyl benzoate, n- or iso-propyl benzoate, n-, iso-, sec- or tert-butyl benzoate, methyl p-toluate, ethyl p-toluate, n- or iso-propyl p-toluate, n- or iso-amyl p-toluate, ethyl o-toluate, ethyl m-toluate, methyl p-ethylbenzoate, ethyl o-ethylbenzoate, methyl anisate, ethyl anisate, n- or iso-propyl anisate, methyl p-ethoxybenzoate, ethyl p-ethoxybenzoate, methyl terephthalate, etc. Of these compounds, preferred are methyl benzoate, ethylbenzoate, methyl p-toluate, ethyl p-toluate, methyl anisate, ethyl anisate and the like.

Description will be given with regard to the synthesis of solid catalyst component (A) obtained by reacting and/or grinding the above-mentioned solid material (1), titanium compound (2) and compound (3) selected from N, S or O— containing heterocyclic carboxylic acid esters or hydrocarbyl carboxylic acid esters.

For the reaction and/or grinding of the above mentioned solid (1), the titanium compound (2) and the carboxylic acid ester (3), any of the methods can be adopted such as [1] a method in which a titanium compound and a carboxylic acid ester are reacted in a liquid or gas phase, or [2] a method in which a liquid or gas phase reaction and/or grinding are combined.

The method [1] includes a process of simultaneous reaction of the solid, titanium compound and carboxylic acid ester (method ①), a process of reacting the solid and a titanium compound followed by the reaction with a carboxylic acid ester (method ②), and a process of first reacting the solid and the carboxylic acid ester followed by reaction with a titanium compound (method ③). Although any of these methods may be employed, the latter two methods, especially method ③, are preferred.

With regard to the method [2], three cases, i.e., where the titanium compound has the valence of 4 (I), valence of 3 (II), and valences of both 3 and 4 (III), are hereinafter described.

In the case of (I), there are mentioned, grinding the solid obtained by simultaneously reacting the above mentioned solid (1), tetravalent titanium compound (2-1) and carboxylic acid ester (3) (synthesis ①), grinding the solid obtained by first reacting the above mentioned solid (1) and the tetravalent titanium compound (2-1) followed by further reaction with the carboxylic acid ester (3) (synthesis ②), and grinding the solid obtained by first reacting the above mentioned solid (1) and the carboxylic acid ester (3) thereof followed by reaction with the tetravalent titanium compound (2-1) (synthesis ③). Any of them may be employed but the latter two methods are preferred. Especially synthesis ③ gives favorable results.

In the case of trivalent titanium compound (II), various methods are possible for preparing a solid catalyst (A) from said solid (1), a trivalent titanium compound (2-2) and a carboxylic acid ester (3), but especially the following three methods give favorable results; namely a method wherein the three components are ground together (synthesis ①), a method wherein the solid (1) and the carboxylic acid ester (3) are first contacted and then mechanical grinding is carried out after the addition of the trivalent titanium compound (2-2) (synthesis ②), and a method wherein the solid (1) and the trivalent titanium compound (2-2) are mechanically ground, followed by the treatment with a carboxylic acid ester (3) (synthesis ③).

In the case of both tetra and trivalent titanium compound (III), a method wherein the solid (1), a tetravalent titanium compound (2-1), a trivalent titanium compound (2-2), and a carboxylic acid ester (3) are simultaneously ground (synthesis ①), a method wherein solid obtained by reacting (1) and (2-1) is treated with (3) followed by grinding thereof together with (2-2) (synthesis ②), a method wherein solid obtained by reacting (1) and (3) is treated with (2-1) followed by grinding thereof together with (2-2) (synthesis ③), a method wherein solid obtained by reacting (1) and (2-1), is ground after addition of (2-2) and (3) (synthesis ④), and the like may be mentioned. Among them, synthesis ③ is preferred.

Further, by treating the solid catalyst component (A) prepared by the method [1] and [2] described above with a tetravalent titanium compound (4) containing at least one halogen atom, further increase of catalyst efficiency, i.e., the first feature of the present invention, is attained. A tetravalent titanium compound (2-1) mentioned above is employed as a tetravalent titanium compound (4), and titanium tetrahalide, especially titanium tetrachloride, is preferred.

Firstly, among the methods wherein solid catalyst component (A) synthesized by the method [1] is treated with the above mentioned halogenated tetravalent titanium, there are included a method of treating the solid catalyst component (A) obtained by the method [1]-①, [1]-② and [1]-③, with the tetravalent titanium.

Next, with regard to the method wherein the solid catalyst component (A) synthesized according to method [2] is further treated with a tetravalent titanium halide, explanation will be given for (I), (II) and (III).

In the case of (I), there are three possible methods wherein the solid catalyst component (A) synthesized according to [2]-(I)-①, [2]-(I)-② and [2]-(I)-③ are respectively treated with a tetravalent titanium halide, but the latter two methods are preferred.

In the case of (II), there are four possible methods wherein the solid catalyst component (A) synthesized according to the methods [2]-(II)-①, [2]-(II)-②, [2]-(II)-③ and [2]-(II)-④ are respectively treated with a tetravalent titanium halide.

In the case of (III), there may be mentioned a method wherein a solid (1), a tetravalent titanium compound (2-1), a trivalent titanium compound (2-2), and a carboxylic acid ester (3) are simultaneously ground, followed by the treatment with a tetravalent titanium halide (synthesis ①), a method wherein the solid obtained by reacting (1) and (2-1) is treated with (3), ground together with (2-2) and treated with a tetravalent titanium halide (synthesis ②), a method wherein the solid obtained by reacting (1) and (3) is treated with (2-1), ground together with (2-2), and further treated with a tetravalent titanium halide (synthesis ③), a method wherein the solid obtained by reacting (1) and (2-1) is ground together after addition of (2-2) and (3) and further treated with a tetravalent titanium halide (synthesis ④). Among them, the methods ②, ③ and ④ are preferred.

Next, the operating conditions of reacting and/or grinding the above-mentioned solid, titanium compound, and carboxylic ester will be explained.

(i) Firstly explanation will be made with regard to the reaction between a solid (1) [obtained by reacting an organomagnesium component (i) and a chlorosilane compound (ii)] or a reaction product of this solid (1) and a carboxylic acid ester (3), and a titanium compound (2).

The reaction may be carried out using an inert reaction medium or using an undiluted titanium compound per se as a reaction medium without using an inert reaction medium. As an inert reaction medium, for example, there may be mentioned aliphatic hydrocarbons such as hexane and heptane, aromatic hydrocarbons such as benzene, toluene, and xylene, alicyclic hydrocarbons such as cyclohexane and methylcyclohexane, and the like, among which aliphatic hydrocarbons are preferred. The reaction temperature and the concentration of the titanium compound, though not specifically limited, are preferably in the range of 80° C. or higher and about 2 mol/l of the titanium compound or higher, respectively. Still more preferably, undiluted titanium compound per se is used for carrying out the reaction as a reaction medium. With regard to a reaction mole ratio, excess titanium compound relative to the magnesium component in the solid gives good results.

(ii) Secondly, explanation will be given about the reaction between a solid (1) [obtained by reacting an organomagnesium component (i) and a chlorosilane compound (ii)], or a reaction product of this solid (1) with a titanium compound (2) and a carboxylic acid ester (3).

The reaction is carried out using an inert reaction medium. As the inert reaction medium, any of the above mentioned aliphatic, aromatic or alicyclic hydrocarbons may be used. The reaction temperature, though not specifically limited, preferably ranges from room temperature to 100° C. In case a solid (1) and a carboxylic acid ester (3) are reacted, the ratio of the two components is not specifically limited. However, it is recommended that the amount of carboxylic acid ester ranges between 0.001 mol–50 mols, preferably 0.005 mol–10 mols relative to one mol of hydrocarbon group contained in the solid (1). In case the reaction product of the solid (1) and a titanium compound (2) is reacted with a carboxylic acid ester (3), a ratio of the two components ranging 0.01 mol–100 mols, preferably 0.1 mol–10 mols of the amount of carboxylic acid ester relative to one mol of titanium atom in the solid (1) is recommended.

(iii) Thirdly, explanation will be given with regard to the method of grinding the solid formed according to the above mentioned reactions (i)–(ii). As a grinding means, well known mechanical grinding means such as a rotary ball mill, a vibration ball mill, an impact ball mill, and the like may be employed. Grinding time is in the range of 0.5–100 hours, preferably 1–30 hours, and grinding temperature is in the range of 0°–200° C., preferably 10°–150° C.

(iv) Fourthly, explanation will be given with respect to the treatment of the solid catalyst component (A) obtained according to (i)–(iii) with a tetravalent titanium compound. The reaction is carried out using an inert reaction medium or utilizing the titanium compound itself as a reaction medium. As an inert reaction medium, there may be mentioned, for example, aliphatic hydrocarbons such as hexane or heptane, aromatic hydrocarbons such as benzene, toluene, etc., and alicyclic hydrocarbons such as cyclohexane, methylcyclohexane, etc., but aliphatic hydrocarbons are preferred. The concentration of the titanium compound is preferably 2 mol/l or higher; especially preferred is the use of the titanium compound itself as a reaction medium. Although the reaction temperature is not specifically limited, good results are obtained when reaction is conducted at a temperature of 80° C. or higher.

Although the composition and the structure of the solid catalyst component (A) obtained according to the above mentioned reactions (i) to (iv) vary depending on starting material and reaction conditions, it was found from the analysis of the composition that the solid catalyst component (A) contains approximately 1–10 percent by weight of titanium and has a surface area of 50–300 m²/g.

Organometallic compounds used as component (B) are compounds of metals of Groups I–III of the Periodic Table and especially an oranoaluminum compound is preferred. As organoaluminum compounds, those represented by the general formula $AlR_t^4Z_{3-t}$ (wherein $R^4$ is a hydrocarbon group having 1–20 carbon atoms, Z is a member selected from hydrogen, halogen, alkoxy, aryloxy and siloxy, and t is 2–3) are used individually or as a mixture. In the above formula, hydrocarbon groups having 1–20 carbon atoms and represented by $R^4$ include aliphatic hydrocarbons, aromatic hydrocarbons and alicyclic hydrocarbons.

Specifically, for example, triethylaluminum, tri-n-propylaluminum, triisopropylaluminum, tri-n-butylaluminum, triisobutylaluminum, trihexylaluminum, trioctylaluminum, tridecylaluminum, tridodecylaluminum, trihexadecylaluminum, diethylaluminum hydride, diisobutylaluminum hydride, diethylaluminum ethoxide, diisobutylaluminum ethoxide, dioctylaluminum butoxide, diisobutylaluminum octyloxide, diethylaluminum chloride, diisobutylaluminum chloride, dimethylhydrosiloxyaluminum dimethyl, ethylmethylhydrosiloxyaluminum diethyl, ethyldimethylsiloxyaluminum diethyl, aluminum isoprenyl and the like, and mixtures thereof are recommended.

A combination of these alkylaluminum compounds with the above mentioned solid catalyst component (A) provides a highly active catalyst, and especially trialkylaluminum and dialkylaluminum hydride are preferred because they have the highest activity.

The nitrogen-containing heterocyclic carboxylic acid ester, sulfur-containing heterocyclic carboxylic acid ester and oxygen-containing heterocyclic carboxylic acid ester to be used with an organometallic compound (B) may be the same as or different from the compound used for preparation of the solid catalyst component (A). As to the manner of addition of the heterocyclic carboxylic acid ester and the organometallic compound, the two components may be mixed prior to polymerization or they may be added to the polymerization system separately. Especially preferred is to add separately the previously prepared reaction product of an organometallic compound and a heterocyclic carboxylic acid ester and an organometallic compound to the polymerization system.

The ratio of the heterocyclic carboxylic acid ester amounts to less than about 10 mol, preferably about 0.01 mol to 1 mol relative to one mol of the organometallic compound.

The catalyst components of the present invention comprising the solid catalyst component (A) and the component (B) of an organometallic compound incorporated with a heterocyclic carboxylic acid ester may be added to the polymerization system separately or may be blended prior to the polymerization.

The ratio of the component comprising an organometallic compound with a heterocyclic carboxylic acid ester relative to 1 gram of the solid catalyst component preferably ranges from about 1 millimol to 3000 millimol.

The present invention relates to highly active catalysts for highly stereospecific polymerization of olefins. Especially the present invention is suitable for polymerizing stereoregularly propylene, butene-1, pentene-1, 4-methylpentene-1, 3-methylbutene-1 and like olefins. Also it is suitable for copolymerizing said olefins with ethylene or other olefins. Further it is suitable for polymerizing ethylene with better efficiency. It is also possible in the present invention to add hydrogen, a halogenated hydrocarbon or an organometallic compound which is liable to cause chain transfer in order to regulate the molecular weight of the polymer.

As to the manner of polymerization, a usual suspension polymerization, a bulk polymerization in liquid monomers, or a gas phase polymerization can be employed. Suspension polymerization may be carried out at room temperature-150° C. by introducing the catalyst together with a polymerization solvent e.g., an aliphatic hydrocarbon such as hexane or heptane, an aromatic hydrocarbon such as benzene, toluene or xylene, or an alicyclic hydrocarbon such as cyclohexane or methylcyclohexane, and introducing an olefin such as propylene under a pressure of 1–20 kg/cm² under inert atmosphere. Bulk polymerization of olefins may be carried out with an olefin such as propylene being in the liquid state using a catalyst and the liquid olefin as a polymerization solvent. For example, propylene can be polymerized in propylene itself under a pressure of 10–45 kg/cm² at a temperature of from room temperature to 90° C. On the other hand, gas phase polymerization can be carried out, e.g., under a pressure of 1–50 kg/cm² and at a temperature ranging from room temperature to 120° C. in the absence of a solvent, by means of a fluidized bed, a movable bed or mechanical stirrer so that the olefin such as propylene and the catalyst can be well contacted.

Hereinafter the present invention will be explained by examples. In the examples, insoluble matter of n-heptane extraction means the residue left after six hour extraction of polymer with boiling n-heptane, and melt flow index (MFI) is measured according to ASTM D1238, wherein temperature and load are 230° C. and 2.16 kg, respectively. Angle of repose is measured according to bulk density.

EXAMPLE 1

(I) Synthesis of hydrocarbon soluble organomagnesium complex

Di-n-butyl magnesium (138.0 g) and triethylaluminum (19.0 g) were charged into a 2 l volume flask, purged with nitrogen, together with heptane (1 l) and reacted at 80° C. for two hours to obtain a solution of an organomagnesium complex. Analysis showed that the complex had a composition of $AlMg_{6.0}(C_2H_5)_{2.9}(n\text{—}C_4H_9)_{12.1}$ and the concentration of the organometal was 1.25 mol/l.

(II) Preparation of a solid material by the reaction with a chlorosilane compound Oxygen and moisture in a 2 l volume flask fitted with a dropping funnel were purged with nitrogen and, under nitrogen atmosphere, one liter of heptane containing 1 mol of trichlorosilane (HSiCl$_3$) was charged to the flask and heated to 65° C. Next, 500 mmol of the solution of said organomagnesium complex was added thereto dropwise with stirring over one hour, and further reacted therewith at this temperature for one hour. The resultant insoluble white precipitate was isolated, washed with n-hexane, and dried to obtain 42.5 g of a white solid material (A-1). Analysis showed that 1 g of this solid contained 9.16 mmol of Mg, 19.20 mmol of Cl, 1.70 mmol of Si and 0.58 mmol of alkyl group, and the specific surface area measured by the B.E.T. method was 269 m$^2$/g.

(III) Preparation of a solid catalyst component

To a 2 l vessel fully purged with nitrogen, 20 g of the above white solid material (A-1) was added together with 600 ml of n-hexane and 15.0 mmol of 2-thiophenecarboxylic acid ethyl ester. The mixture was reacted with stirring one hour at 80° C. to obtain solid (B-1). To a pressure proof vessel having been purged with nitrogen was charged 18 g of the solid (B-1) and 300 ml of titanium tetrachloride. After reaction was conducted with stirring at 130° C. for two hours, the solid portion was isolated by filtration, washed thoroughly with hexane, and dried, and a solid catalyst component (S-1) was obtained. Analysis of this solid showed that it contains 2.2% by weight of Ti.

(IV) Slurry polymerization of propylene

The solid catalyst component (80 mg) synthesized in (III), above, 2.4 mmol of triethylaluminum and 0.8 mmol of 2-thiophenecarboxylic acid ethyl ester were charged together with 0.8 liter of hexane into a 1.5-liter autoclave, the inside of which had been purged with nitrogen and deaerated in vacuo. While the temperature inside the autoclave was being maintained at 60° C., propylene were pressurized to 5.0 kg/cm$^2$ so that a total gauge pressure of 4.8 kg/cm$^2$ could be achieved. Polymerization was allowed to proceed for two hours by supplying propylene, while maintaining a total gauge pressure of 4.8 kg/cm$^2$. There were obtained 170 g of a hexane-insoluble polymer and 6.2 g of a hexane-soluble polymer.

Catalyst yield was 9660 g-PP/g of Ti.hr.propylene pressure. After the hexane-insoluble polymer was extracted with boiling heptane, the remaining portion was 95.7%.

EXAMPLE 2

(I) Synthesis of a hydrocarbon-soluble organomagnesium complex

Di-n-butyl-magnesium (138.0 g) and 19.0 g of triethylaluminum were taken up in a 2-liter flask having been purged with nitrogen, together with 1 liter of n-heptane. The mixture was reacted with stirring at 80° C. for 2 hours to obtain an organomagnesium complex solution. Analysis of this complex revealed that it had the composition AlMg$_{6.0}$(C$_2$H$_5$)$_{2.9}$ (n—C$_4$H$_9$)$_{12.1}$ and an organometal concentration of 1.20 mol/l.

(II) Synthesis of a solid material by the reaction with a chlorosilane compound

To a 2-liter flask fitted with a dropping funnel and a cooler, having been fully purged with nitrogen, there was charged one liter of hexane containing 1 mol of monomethyl dichlorosilane (HSiCl$_2$CH$_3$) under a stream of nitrogen. While the flask was maintained at 65° C., 500 mmol of the above-mentioned solution of an organomagnesium complex was added dropwise over one hour through the dropping funnel. Thereafter, the mixture was reacted with stirring at 65° C. for one hour. A white solid material thus formed was filtered off, washed with n-hexane and dried to obtain 42.6 g of a white solid (A-2). Analysis of this solid showed that it contained 9.18 mmol Mg, 19.20 mmol Cl, 1.70 mmol Si, and 0.60 mmol alkyl groups per gram of solid. The specific surface area measured by the B.E.T. method was 216 m$^2$/g.

(III) Synthesis of a solid catalyst component

To a 2 l vessel fully purged with nitrogen, the above white solid (A-2, 20 g) and 600 ml of n-hexane were added with stirring. Then, 100 ml of n-hexane and 15.0 mmol of 2-thiophenecarboxylic acid ethyl ester were added dropwise with stirring over one hour at 80° C. The mixture was further reacted with stirring one hour at 65° C. The formed white solid was filtered, washed with hexane, and dried to obtain a white solid material (B-2).

To an autoclave having been purged with nitrogen were added 18 g of said white solid material (B-2), and 300 ml of titanium tetrachloride. The mixture was reacted with stirring at 130° C. for 2 hours. The solid portion was filtered off, isolated, washed fully with hexane, and dried to obtain a solid (C-2).

The solid (C-2, 4.0 g) were fed under nitrogen atmosphere to a 100 mm stainless steel ball mill containing twenty five 9-mm$\phi$ stainless steel balls. The ball mill was vibrated at a speed of more than 1,000 vib/min for 5 hours, to obtain a solid catalyst component (S-2). This component had a Ti content of 2.2 wt.%.

(IV) Slurry polymerization of propylene

The slurry polymerization of propylene was carried out in the same manner as in Example 1, using the solid catalyst component (S-2, 50 mg) synthesized in (III), above, 2.4 mmol of triethylaluminum and 0.8 mmol of 2-thiophenecarboxylic acid ethyl ester. There were obtained 151 g of hexane-insoluble polymer and 5.7 g of a hexane-soluble portion. After the hexane-insoluble polymer was extracted with n-heptane, the remaining portion was 95.0%. The catalyst yield was 13,700 g of PP/g of Ti.hour.propylene pressure.

EXAMPLE 3

To an autoclave having been purged with nitrogen were fed 2.0 g of the solid catalyst component (S-2) prepared in Example 2 and 30 ml of titanium tetrachloride. The mixture was reacted with stirring at 130° C. for 2 hours. The solid portion was separated by filtration, washed fully with hexane, and dried to obtain a solid catalyst component (S-3). Analysis of this solid showed that it contained 2.3% by weight of titanium.

The slurry polymerization of propylene was conducted in the same manner as in Example 1, using the solid catalyst component (S-3, 30 mg), 2.4 mmol of triethylaluminum and 0.8 mmol of 2-thiophenecarboxylic acid ethyl ester. There were obtained 145 g of a hexane-insoluble polymer and 4.4 g of a hexane-soluble portion. The catalyst yield was 21,000 g-PP/g of Ti.-hour.propylene pressure. After the hexane-insoluble polymer was extracted with n-heptane, the remaining portion was 96.4%.

EXAMPLE 4

Liquid propylene (350 g) was charged into a 1.5-liter autoclave, the inside of which had been purged with nitrogen and deaerated in vacuo. The inside temperature was raised to 60° C. The solid catalyst component (S-3, 10 mg) synthesized in Example 3, 1.8 mmol of triethylaluminum and 0.6 mmol of 2-thiophenecarboxylic acid ethyl ester were then added to the autoclave. While maintaining the inside temperature at 60° C., the polymerization was allowed to proceed for 2 hours, to obtain 152 g of a polymer. The catalyst yield was 330,000 g of PP/g of Ti.hour. After the polymer was extracted with n-heptane, the remaining portion was 94.6%.

COMPARATIVE EXAMPLE 1

A solid catalyst component was prepared in the same manner as in part (III), Example 1, using commercially available anhydrous magnesium chloride instead of the solid material prepared in part (II), Example 1 by reacting an organomagnesium complex with a chlorosilane compound. The solid catalyst component contained 0.81 wt.% of titanium. Slurry polymerization was carried out in the same manner as in Example 1, using 100 mg of this solid catalyst component, 2.4 mmol of triethylaluminum, and 0.8 mmol of 2-thiophenecarboxylic acid ethyl ester. There were obtained 7.8 g of a hexane-insoluble polymer and 2.1 g of a hexane-soluble portion. After the hexane-insoluble polymer was extracted with boiling n-heptane, the remaining portion was 77.2%. The catalyst yield was 962 g of PP/g of Ti.hour.propylene pressure.

COMPARATIVE EXAMPLE 2

In the reaction of an organomagnesium complex with chlorosilane described in part (II), Example 1, there was used methyl trichlorosilane, $SiCl_3CH_3$, instead of $HSiCl_3$. 2.06 g of a white solid material was obtained. Yield of the solid material was 1/20 that in part (II), Example 1.

EXAMPLE 5

A magnesium-containing solid (5.0 g) synthesized as in part (II), Example 1 and 40 mmol of 2-furan-carboxylic acid ethyl ester were reacted in the same manner as in Example 1. 4.5 g of the obtained solid and 0.38 g of titanium trichloride ($TiCl_3 \cdot \frac{1}{3}AlCl_3$ of a AA grade, prepared by Toyo Stauffer Company) were ground under nitrogen atmosphere in a vibrating ball mill for 5 hours. This solid (C-5, 4.3 g) was reacted with 60 ml of titanium tetrachloride at 130° C. for 2 hours with stirring. Thereafter the solid portion was filtered off, washed and dried to obtain a solid catalyst component (S-5). The solid catalyst component had a Ti content of 2.2 wt.%.

Slurry polymerization of propylene was conducted in the same manner described in Example 1, using 50 mg of the solid catalyst component (S-5), 2.4 mmol of triethylaluminum and 0.8 mol of 2-furancarboxylic acid ethyl ester. Results obtained were as given in Table 1.

EXAMPLE 6

Slurry polymerization of propylene was carried out in the same manner described in Example 5 except that 100 mg of the solid (C-5), wherein a Ti-content was 1.7 wt.%, was used as the solid catalyst component. Results were as given in Table 1.

EXAMPLE 7

As the same manner described in Example 1, the magnesium-containing solid was first reacted with 2-thiophenecarboxylic acid butyl ester, further reacted with titanium tetrachloride. 3.95 g of the obtained solid and 0.16 g of titanium trichloride (Grade AA, prepared by Toyo Stauffer Company) were ground for 5 hours in a vibration type ball mill. The obtained solid (C-7, 3.2 g) was reacted with 80 ml of titanium tetrachloride at 130° C. for 2 hours with stirring. After the reaction, a solid portion was filtered, washed and dried to obtain a solid catalyst component (S-7) which had a Ti-content of 4.1 wt.%.

Slurry polymerization of propylene was carried out in the same manner as in Example 1, using 30 mg of the solid catalyst component (S-7), 2.4 mmol of triethylaluminum and 0.8 mmol of 2-thiophenecarboxylic acid methyl ester. Results are given in Table 1.

EXAMPLE 8

Slurry polymerization of propylene was conducted in the same manner described in Example 7 except that 50 mg of the solid (C-7), wherein a Ti-content was 3.6 wt.%, was used as the solid catalyst component. Results are given in Table 1.

EXAMPLE 9

(I) Synthesis of a hydrocarbon-soluble organomagnesium conjugated-complex

Di-n-butyl-magnesium (138 g), and triethylaluminum (19 g) together with 1 l of heptane were introduced in a 2 l flask having been purged with nitrogen and the mixture was reacted at 80° C. for 2 hours, to obtain a solution of an organomagnesium complex. Analysis of this complex showed that its composition was $AlMg_{6.0}(C_2H_5)_{2.9}(n-C_4H_9)_{12.1}$. It had an organometal concentration of 1.15 mol/l.

In a vessel purged with nitrogen, 500 mmol of the above complex was weighed, and 80 mmol of toluene solution of m-cresol (0.51 mol/l) was added dropwise with stirring over one hour to the vessel maintained at 30° C. After the reaction, an organomagnesium conjugated complex was obtained.

(II) to (IV) Synthesis of a solid material and a solid catalyst component; and polymerization In the same manner described in part (II) of Example 1, a magnesium containing solid was synthesized using 500 mmol of the above magnesium conjugated complex and 500 mmol of dichloromethylsilane ($HSiCl_2CH_3$) instead of trichlorosilane. Using the magnesium containing solid with 2-thiophenecarboxylic acid methyl ester, a solid catalyst component was synthesized in the same manner as in Example 3.

Slurry polymerization of propylene was conducted in the same manner as in Example 1, using 30 mg of the solid catalyst component, wherein the content was Ti 2.2 wt.%, 2.4 mmol of triethylaluminum and 0.8 mmol of pyrrol-2-carboxylic acid ethyl ether. Results were as given in Table 1.

TABLE 1

| Example | Hexane-insoluble portion of polymer (g) | Hexane-soluble portion of polymer (g) | Cat. yield (g-PP/g-Ti · hour · propylene pressure) | Remaining portion after the hexane-insoluble polymer was extracted with boiling heptane (%) |
|---|---|---|---|---|
| 5 | 140 | 3.0 | 12700 | 95.7 |
| 6 | 132 | 5.2 | 8250 | 94.4 |
| 7 | 143 | 4.5 | 11600 | 96.5 |
| 8 | 156 | 6.0 | 8670 | 95.6 |
| 9 | 145 | 4.7 | 22000 | 96.7 |

EXAMPLES 10 TO 12 AND COMPARATIVE EXAMPLE 3

An organomagnesium conjugated complex was prepared by employing the same procedure described in Example 9 except that diethylketone was used instead of m-cresol. To obtain a magnesium containing solid, the same procedure as in Example 9 was repeated except that 1.0 mol of trichlorosilane ($HSiCl_3$) and 500 mmol of the above organomagnesium conjugated complex were used instead of 500 mmol of $HSiCl_2CH_3$ and the organomagnesium conjugated complex in Example 9, respectively. A solid catalyst component was synthesized in the same manner as in Example 3, except for using the above magnesium containing solid and ethyl benzoate (instead of 2-thiophenecarboxylic acid methyl ester).

Polymerization of propylene was carried out in the same manner as in Example 1, using 30 mg of the solid catalyst component, (Ti content is 2.3 wt.%), 2.4 mmol of triethylaluminum and the amount shown in Table 2 of pyridine-3-carboxylic acid methyl ester. Results were as given in Table 2.

TABLE 2

| | Amount of pyridine-3-carboxylic acid methyl ester (mmol) | Results of polymerization | | | |
|---|---|---|---|---|---|
| | | Hexane-insoluble portion (g) | Hexane-soluble portion (g) | Cat. yield (g-PP/g-Ti · hour · propylene pressure) | Remaining portion after the hexane-insoluble polymer was extracted with heptane (%) |
| Comparative Example 3 | 0 | 136 | 9.5 | 19700 | 86.7 |
| Example 10 | 0.3 | 163 | 10.8 | 23600 | 90.3 |
| Example 11 | 0.6 | 153 | 5.8 | 22200 | 93.6 |
| Example 12 | 0.8 | 141 | 3.1 | 20400 | 95.7 |

EXAMPLES 13 TO 23

In the synthesis of a solid catalyst component in Example 2, components shown in Table 3 were used, and further treated with titanium tetrachloride under the same procedure as in Example 3. Slurry polymerization of propylene was carried out in the same manner described in Example 3, using 30 mg of the treated solid catalyst component, 2.4 mmol of an aluminum compound and 0.8 mmol of an electron donor shown in Table 3, respectively. The results obtained were as given in Table 3.

TABLE 3

| | Synthesis of solid catalyst component | | | | | |
|---|---|---|---|---|---|---|
| | Synthesis of magnesium containing solid (1) | | | | | |
| Ex. | Organomagnesium component | Reaction-ratio Mg/Si | Chlorosilane compound | Reaction temperature(°C.) × Reaction time (hr.) | Carboxylic acid ester (3) | Ti-Compound (2) grinding-time is shown by [hr.] |
| 13 | $AlMg_{6.0}Et_{2.9}n-Bu_{12.1}$ | 1/3 | $HSiCl_2C_2H_5$ | 65° C. × 2 hrs. | ethyl p-toluate | $Ti(On-Bu)_3Cl$ [5] |
| 14 | $AlMg_{3.0}Et_{2.8}n-Bu_{6.2}$ | 1/1 | $HSiCl_2CH_3$ | " | ethyl p-anisate | $Ti(Oi-Pr)_2Cl_2$ [5] |
| 15 | $ZnMg_{2.0}Et_{2.1}n-Bu_{3.9}$ | 1/2 | $HSiCl_3$ | " | methyl benzoate | $Ti(On-Bu)Cl_3$ [10] |
| 16 | $BeMg_{4.0}Et_{3.7}n-Pr_{6.3}$ | 1/2 | $HSiCl_2C_2H_5$ | " | methyl 2-furan carboxylate | $TiCl_4$ [24] |
| 17 | $BMg_{1.0}Et_{2.8}n-Pr_{2.2}$ | 1/2 | $HSiClCH_3 \cdot C_2H_5$ | " | n-propyl benzoate | " |
| 18 | $sec-Bu_2Mg$ | 1/2 | $HSiCl_2CH_3$ | 50° × 2 hrs. | ethyl benzoate | " |
| 19 | sec-BuMgEt | 1/2 | $HSiCl(CH_3)_2$ | " | methyl p-toluate | " |
| 20 | $(n-C_6H_{13})_2Mg$ | 1/1 | $HSiCl_2C_2H_5$ | " | N-carboethoxy pyrrol | " |
| 21 | $n-BuMgCl \cdot nBu_2O$ | 1/2 | $HSiCl_3$ | 65° C. × 2 hrs. | ethyl 2-thiophene carboxylate | " |
| 22 | n-BuMgCl ($n-Bu_2O$ solution) | 1/1 | $HSiCl_2CH_3$ | " | ethyl pyridine-3-carboxylate | " |
| 23 | n-BuMgCl (solid) | 2/1 | $HSiCl_3$ | " | Propyl 2-thiophene carboxylate | " |

| 1 | | | Polymerization results | | | |
|---|---|---|---|---|---|---|
| Aluminum compound and electron donor (amount employed is the same as in Example 3) | | | Ti-content in solid cat. component (wt.%) | Yield of hexane-insoluble polymer (g) | Hexane-soluble portion (g) | Cat. yield (g-PP/g-Ti · hour · propylene pressure) | Remaining portion after the hexane-insoluble polymer was extracted with heptane (%) |
| $Al(Et)_3$ | 3-thiophene carboxylic acid ethyl ester | | 2.7 | 116 | 4.7 | 14300 | 93.3 |
| " | 2-furan carboxylic | | 2.6 | 129 | 5.3 | 16500 | 93.7 |

TABLE 3-continued

Synthesis of solid catalyst component

| | | | | | | |
|---|---|---|---|---|---|---|
| " | acid methyl ester coumalic acid ethyl ester | 2.2 | 127 | 6.1 | 19200 | 94.3 |
| Al(i-Bu)$_3$ | pyridine-4-carboxylic acid ethyl ester | 2.1 | 136 | 4.3 | 21600 | 94.8 |
| AlEt$_2$·H | pyridine-2-carboxylic acid methyl ester | 2.3 | 126 | 5.0 | 18300 | 95.5 |
| AlEt$_3$ | pyrrol-2-carboxylic acid methyl ester | 2.7 | 138 | 5.3 | 17000 | 96.1 |
| " | pyridine-2-carboxylic acid ethyl ester | 2.4 | 140 | 3.5 | 19400 | 93.9 |
| " | 2-thiophene carboxylic acid n-propyl ester | 2.5 | 145 | 4.3 | 19300 | 94.8 |
| " | 2-thiophene carboxylic acid n-butyl ester | 2.8 | 136 | 3.4 | 16200 | 94.9 |
| " | N-carboethoxy pyrrol | 3.5 | 140 | 3.9 | 13300 | 95.2 |
| " | 2-furan carboxylic acid ethyl ester | 2.6 | 115 | 4.1 | 12800 | 94.7 |

EXAMPLE 24

In this example, the catalyst comprises 1.8 mmol of triethylaluminum, 0.6 mmol of 2-thiophenecarboxylic acid ethyl ester and 10 mg of a solid catalyst component having 2.4% of Ti obtained by the same procedure described in Example 3. Using this catalyst, slurry polymerization was carried out in the same procedure described in Example 1 except that propylene and hydrogen were charged at a pressure of 10 kg/cm$^2$ and at a partial pressure of 0.04 kg/cm$^2$, respectively, so as to keep a total gauge pressure of 9.8 kg/cm$^2$. There were obtained 122 g of a hexane-insoluble polymer and 4.3 g of a hexane-soluble portion. After the n-hexane-insoluble polymer was extracted with n-heptane, the remaining portion was 96.4%. The catalyst yield was 254000 g-PP/g-Ti.hour.propylene pressure. The Ti-content and chlorine-content in the hexane-insoluble polymer were 2 ppm and 55 ppm, respectively. Further the hexane-insoluble polymer showed 8.1 g/minute of MFI, bulk density of 0.43 g/cm$^3$, 33.2° angle of repose and 91.5% particles of 35 to 150 mesh.

EXAMPLE 25

Using a catalyst comprising 200 mg of the solid catalyst component (S-3) obtained in Example 3, 4.6 mmol of triethylaluminum and 1.2 mmol of 2-thiophene carboxylic acid ethyl ester, polymerization of butene-1 was carried out according to the polymerization conditions described in Example 1. There were obtained 50 g of a white polymer.

EXAMPLE 26

Using a catalyst comprising 200 mg of the solid catalyst component (S-3) obtained in Example 3, 4.6 mmol of triethyl aluminum and 1.2 mmol of 2-thiophene carboxylic acid ethyl ester, polymerization of 4-methylpentene-1 was carried out according to the polymerization conditions described in Example 1. There were obtained 46 g of a white polymer.

EXAMPLE 27

Polymerization was carried out using 30 mg of the solid catalyst component (S-3) synthesized in Example 3, 2.4 mmol of triethylaluminum and 0.8 mmol of 2-thiophene carboxylic acid ethyl ester, and following the same procedure described in Example 1, except that a propylene-ethylene gas mixture containing 2 mol% of ethylene was used in place of propylene. There were obtained 143 g of a white polymer.

EXAMPLE 28

The solid catalyst component (60 mg) synthesized in Example 3, 1.0 mmol of triisobutylaluminum, 0.1 mmol of 2-thiophenecarboxylic acid ethyl ester and 0.8 l of dehydrated and deaerated n-hexane were charged into a 1.5 l autoclave, the inside of which had been fully purged with nitrogen and dried in vacuo. Then, the autoclave was maintained at 80° C. and was charged with 1.6 kg/cm$^2$ of hydrogen followed by ethylene in order to get 4.0 kg/cm$^2$ of total pressure. Polymerization was carried out for 1 hour by supplying ethylene so as to keep a total gauge pressure of 4.0 kg/cm$^2$. There were obtained 144 g of a white polymer.

We claim:

1. In a catalyst useful for polymerizing olefins comprising a magnesium compound, a titanium compound, an electron donor, and an organometallic compound, wherein a solid (1) obtained by reacting one mole of (i) an organomagnesium component of the formula $$M_\alpha Mg_\beta R_p^1 R_q^2 X_r$$

wherein

α, p, q and r each independently $\geq 0$,

β > 0, p + q + r = mα + 2β

M is Al, Zn, B or Be, m is the valence of M, $R^1$ and $R^2$ are the same or different hydrocarbon groups having 1–20 carbon atoms, and X is a halogen atom, or of the reaction product of $M_\alpha Mg_\beta R_p^1 R_q^2 X_r$ with an electron donor, with 0.01 to 100 moles of (ii) a chlorosilane compound containing Si—H bonds and of the formula $$H_a SiClR_{4-(a+b)}^3$$

wherein

0 < a ≤ 2, b > 0, a + b ≤ 4, and $R^3$ is a hydrocarbon group having 1–20 carbon atoms, is used as a catalyst raw material, a solid catalyst component (A) is obtained by reacting and/or grinding said solid (1), a titanium compound (2)

selected from a tetravalent titanium compound containing at least one halogen atom and/or a halide of trivalent titanium, and a carboxylic acid ester (3) and said catalyst component (A) is used with a component (B) which is an organometallic compound and a carboxylic acid ester (3), the improvement wherein said last-mentioned carboxylic acid ester (3) of component (B) is a nitrogen-, sulfur- and/or oxygen-containing heterocyclic carboxylic acid ester.

2. A catalyst for polymerizing olefins according to claim 1, wherein (3) of (B) is a lower alkyl ester of a nitrogen-containing heterocyclic carboxylic acid.

3. A catalyst for polymerizing olefins according to claim 1, wherein (3) of (B) is a lower alkyl ester of a sulfur-containing heterocyclic carboxylic acid.

4. A catalyst for polymerizing olefins according to claim 1, wherein (3) of (B) is a lower alkyl ester of an oxygen-containing heterocyclic carboxylic acid.

5. A catalyst for polymerizing olefins according to claim 1, wherein solid catalyst component (A) is further treated with a halide of tetravalent titanium before combination with (B).

6. A catalyst for polymerizing olefins according to claim 5, wherein the further treating tetravalent titanium halide is titanium tetrachloride.

7. A catalyst for polymerizing olefins according to claim 1, wherein the organomagnesium component (i) is a hydrocarbon-soluble organomagnesium complex which corresponds to $\alpha > 0$ and $r = 0$.

8. A catalyst for polymerizing olefins according to claim 1, wherein the organomagnesium component (i) is a hydrocarbon-soluble organomagnesium compound wherein $\alpha = 0$, $r = 0$, and
   (a) $R^1$ is a secondary or tertiary alkyl group having 4 to 6 carbon atoms, and
   $R^2$ is a hydrocarbon group having 4 to 6 carbon atoms, or
   (b) $R^1$ is an alkyl group having 2 to 3 carbon atoms, and
   $R^2$ is an alkyl group having at least 4 carbon atoms, or
   (c) $R^1$ and $R^2$ both are alkyl groups having at least 6 carbon atoms.

9. A catalyst for polymerizing olefins according to claim 1, wherein the organomagnesium component (i) is an organomagnesium halide wherein $\alpha = 0$, $\beta = 1$, $q = 0$ and $r = 1$.

10. A catalyst for polymerizing olefins according to claim 1, wherein $\alpha > 0$ and $\beta/\alpha$ is from about 0.5 to 10.

11. A catalyst for polymerizing olefins according to claim 1, wherein carboxylic acid ester (3) of component (A) is reacted with the solid (1) in an amount of 0.001 to 50 mols per 1 mol of hydrocarbon group remaining in solid (1).

12. A catalyst for polymerizing olefins according to claim 1, wherein the organometallic compound of component (B) is an organoaluminum compound represented by the general formula $AlR_n^4Z_{3-n}$, wherein $R^4$ is a hydrocarbon group having 1 to 20 carbon atoms; Z is hydrogen, halogen or an alkoxy, aryloxy or siloxy group; and n is 2 or 3.

* * * * *